United States Patent
Kim (10) Patent No.: US 10,432,496 B2
(45) Date of Patent: Oct. 1, 2019

(54) APPARATUS AND METHOD FOR CONTROLLING MESSAGE COMMUNICATIONS LOAD

(71) Applicant: HYUNDAI AUTRON CO., LTD., Seongnam-si (KR)

(72) Inventor: Kyung-Tae Kim, Yongin-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 88 days.

(21) Appl. No.: 15/700,624

(22) Filed: Sep. 11, 2017

(65) Prior Publication Data

US 2018/0077042 A1 Mar. 15, 2018

(30) Foreign Application Priority Data

Sep. 9, 2016 (KR) .................... 10-2016-0116643

(51) Int. Cl.
| | |
|---|---|
| *H04L 1/00* | (2006.01) |
| *H04L 12/26* | (2006.01) |
| *H04L 12/40* | (2006.01) |
| *H04L 12/803* | (2013.01) |
| *H04L 12/46* | (2006.01) |

(52) U.S. Cl.
CPC ............ *H04L 43/106* (2013.01); *H04L 12/40* (2013.01); *H04L 12/4625* (2013.01); *H04L 47/125* (2013.01); *H04L 2012/40215* (2013.01)

(58) Field of Classification Search
CPC ..... H04L 43/106; H04L 12/40; H04L 47/125; H04L 2012/40215
See application file for complete search history.

(56) References Cited

U.S. PATENT DOCUMENTS

| | | | |
|---|---|---|---|
| 2007/0177520 A1* | 8/2007 | Morinaga | H04L 43/0876 370/252 |
| 2010/0115135 A1* | 5/2010 | Zhou | H04L 41/0681 709/247 |
| 2010/0138493 A1* | 6/2010 | Natsume | H04L 12/4135 709/204 |
| 2013/0091286 A1* | 4/2013 | Spencer | H04L 47/25 709/226 |
| 2014/0122956 A1 | 5/2014 | Yun et al. | |

(Continued)

FOREIGN PATENT DOCUMENTS

| | | |
|---|---|---|
| JP | 2010502090 A1 | 1/2010 |
| KR | 1020030008425 A1 | 1/2003 |
| KR | 1020120068582 A1 | 6/2012 |

*Primary Examiner* — Clemence S Han (74) *Attorney, Agent, or Firm* — Baker & Hostetler LLP; Hyunho Park (57) ABSTRACT

Disclosed herein is an apparatus for controlling a message communications load. The apparatus includes a determination unit configured to determine whether a number of messages transmitted to external devices and messages received from the external devices is equal to a predetermined number; a calculation unit configured to calculate a message load based on time stamps and a message occupation time of the messages if it is determined that the number of the messages is equal to the predetermined number; and a control unit configured to transmit a control instruction to the external devices to adjust a communications interval of the received messages according to the calculated message load.

10 Claims, 7 Drawing Sheets

(56) References Cited

U.S. PATENT DOCUMENTS

| | | | |
|---|---|---|---|
| 2016/0191362 A1* | 6/2016 | Hwang | H04L 43/0864 |
| | | | 370/253 |
| 2016/0286434 A1* | 9/2016 | Noldus | H04L 47/12 |
| 2017/0188308 A1* | 6/2017 | Nolan | H04W 52/0258 |
| 2018/0007126 A1* | 1/2018 | Borst | H04L 43/0882 |

* cited by examiner

APPARATUS AND METHOD FOR CONTROLLING MESSAGE COMMUNICATIONS LOAD

CROSS-REFERENCE TO RELATED APPLICATIONS

This application claims the benefit of Korean Patent Application No. 10-2016-0116643, filed on Sep. 9, 2016, entitled "APPARATUS AND METHOD FOR CONTROLLING MESSAGE COMMUNICATION LOAD", which is hereby incorporated by reference in its entirety into this application.

BACKGROUND

1. Technical Field

The present disclosure relates to an apparatus and method for controlling a message communications load, and, more specifically, to an apparatus and method for controlling a message communications load that calculates a message load based on the number of messages, time stamps of the messages and the occupation time of the messages and adjusts communications intervals of messages according to the calculated load.

2. Description of the Related Art

Recently, digital technology has been introduced in most vehicles, and thus the number of electronic devices mounted on vehicles has increased. Accordingly, it is necessary to control vehicle systems in consideration of many variables inside and outside the vehicles. To this end, an electronic control unit (ECU) for controlling all parts of the vehicle such as the driving system and the steering system as well as the engine is employed.

Such ECU conducts communications based on an operating system (OS) for a vehicle. A typical communications scheme is a controller area network (CAN). The CAN communications is a communications standard designed for communications between individual electronic control devices in a vehicle without a host computer.

In such CAN communications, the complexity of the network increases with the number of individual electronic control devices. To avoid this, a gateway processor is used. The gateway processor relays the message exchange between the individual networks to reduce the network complexity of the CAN communications and facilitate communications between the networks.

Even with such a gateway processor, if the number of transmitted/received messages increases suddenly, an overload occurs in the gateway processor, which may result in a communications failure and a failure of the entire system. To address such a problem, there have been proposed a variety of approaches to control message communications loads.

However, according to an existing method for controlling message communications load, the gateway processor itself cannot measure the message load, and thus an additional device for measuring the load is required.

In addition, according to the existing method, the load is measured every cycle even if it is not necessary to measured the load as the amount of transmitted/received messages is small, which is not efficient.

In addition, according to the existing method, it is not possible to actively cope with communications overload because the communications interval of a message received via each channel cannot be controlled according to the message load.

SUMMARY

It is an object of the present disclosure to provide an apparatus and method for controlling a message communications load that can control the communications load efficiently by way of calculating a message load based on the number of transmitted/received messages so that the load is calculated more frequently if there is a large amount of communications and is calculated less frequently otherwise.

It is another object of the present disclosure to provide an apparatus and method for controlling a message communications load that can calculate a message load of a predetermined number of messages accurately by way of calculating the message load based on time stamps included in the transmitted/received messages and a message occupation time.

It is another object of the present disclosure to provide an apparatus and method for controlling a message communications load that can actively cope with communications overload by way of calculating the message load for each of the channels and adjusting the communications interval of the messages received via the channel based on the calculated message load.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an apparatus includes a determination unit configured to determine whether a number of messages transmitted to external devices and messages received from the external devices is equal to a predetermined number; a calculation unit configured to calculate a message load based on time stamps and a message occupation time of the messages if it is determined that the number of the messages is equal to the predetermined number; and a control unit configured to transmit a control instruction to the external devices to adjust a communications interval of the received messages according to the calculated message load.

In accordance with one aspect of the present disclosure, a method includes determining whether a number of messages transmitted to external devices and messages received from the external devices is equal to a predetermined number; calculating a message load based on time stamps and a message occupation time of the messages if it is determined that the number of the messages is equal to the predetermined number; transmitting a control instruction to the external devices to adjust a communications interval of the received messages according to the calculated message load According to an exemplary embodiment of the present disclosure, the communications load can be controlled efficiently by way of calculating a message load based on the number of transmitted/received messages so that the load is calculated more frequently if there is a large amount of communications and is calculated less frequently otherwise.

According to an exemplary embodiment of the present disclosure, a message load of a predetermined number of messages can be calculated accurately by way of calculating the message load based on time stamps included in the transmitted/received messages and a message occupation time.

According to an exemplary embodiment of the present disclosure, it is possible to actively cope with communications overload by way of calculating the message load for each of the channels and adjusting the communications interval of the messages received via the channel based on the calculated message load.

DETAILED DESCRIPTION

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 1:
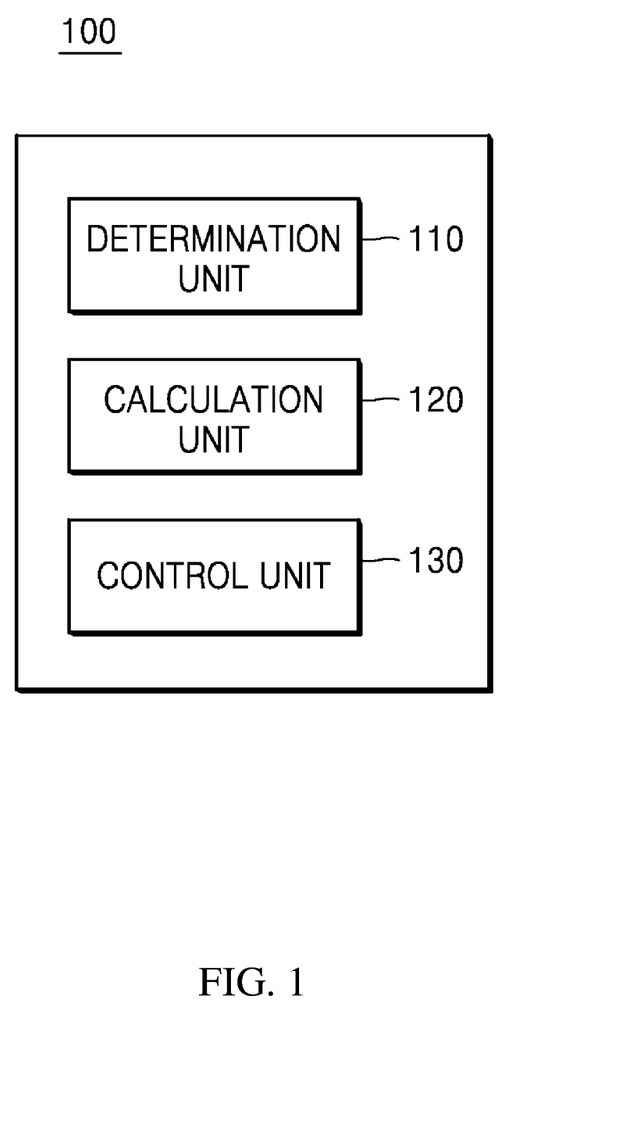
FIG. 1 is a block diagram for illustrating an apparatus for controlling message communications load according to an exemplary embodiment of the present disclosure.

FIG. 1 is a block diagram for illustrating an apparatus 100 for controlling message communications load according to an exemplary embodiment of the present disclosure. Referring to FIG. 1, the apparatus 100 for controlling message communications load may include a determination unit 110, a calculation unit 120, and a control unit 130. The apparatus 100 for controlling message communications load shown in FIG. 1 is merely an exemplary embodiment of the present disclosure, and the elements are not limited to those shown in FIG. 1. Some elements may be added, modified or eliminated as desired.

Figure 2:
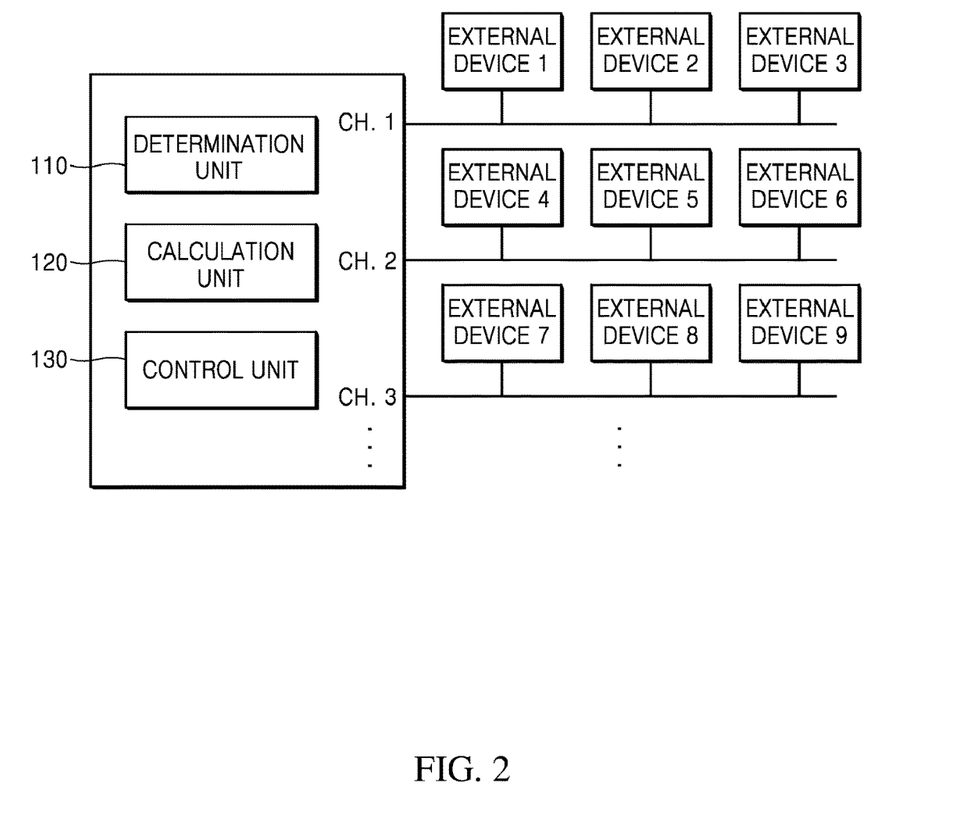
FIG. 2 is a block diagram for illustrating the apparatus connected to external devices via channels according to an exemplary embodiment of the present disclosure.
Figure 3:
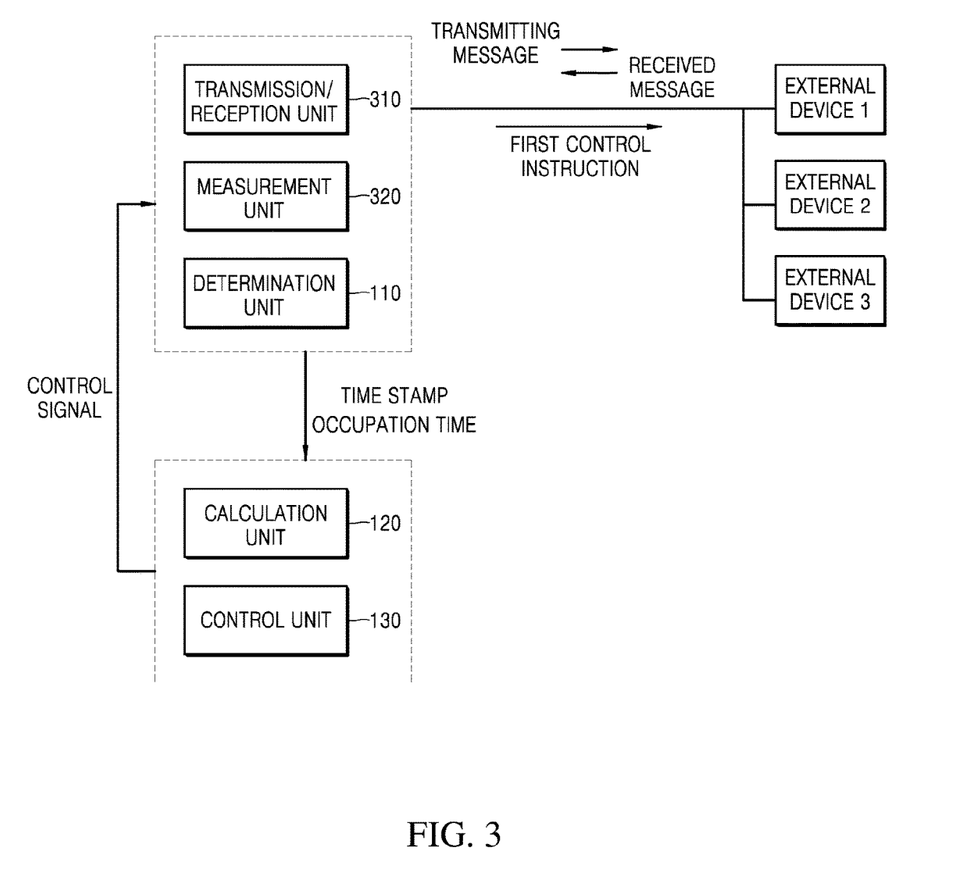
FIG. 3 is a block diagram for illustrating an example of transmitting a first control instruction to external devices based on time stamps and occupation times of a transmitted message and a received message.

FIG. 2 is a block diagram for illustrating the apparatus 100 connected to external devices via channels according to an exemplary embodiment of the present disclosure. FIG. 3 is a block diagram for illustrating an example of transmitting a first control instruction to external devices based on time stamps and occupation times of a transmitted message and a received message. Hereinafter, the apparatus 100 for controlling message communications load and the determination unit 110, the calculation unit 120 and the control unit 130 thereof will be described in detail with reference to FIGS. 1 to 3.

The apparatus 100 for controlling message communications load according to an exemplary embodiment of the present disclosure may be included in a gateway processor that connects a communications network between electronic control units (ECUs) mounted on a vehicle. More specifically, the ECUs for vehicles may use a controller area network (CAN) communications for mutual communications. The CAN is a vehicle bus standard designed for individual ECUs to communicate with one another in a vehicle without a host computer.

The complexity of the network of such CAN communications is greatly increased as the number of individual ECUs increases. Accordingly, a gateway processor for message exchange between the CAN communication networks may be used. The gateway processor may relay the message exchange between the individual networks to reduce the network complexity of the CAN communications and facilitate communications between the networks.

In other words, in a plurality of communications networks including a plurality of ECUs, when a network sends a message to the gateway processor, the gateway processor may receive the message and transmit it to another communications network.

According to an exemplary embodiment of the present disclosure, the determination unit 110 may determine whether the number of transmitted messages transmitted to external devices and the number of received messages received from external devices are equal to predetermined numbers. The external devices may include one or more electronic control devices connected to the apparatus 100 for controlling message communications load through a channel. A message transmitted/received between the apparatus 100 according to the exemplary embodiment of the present disclosure and external devices may include a frame or a packet which is a group of data having a certain bit size.

Such a message is transmitted/received by occupying a bus on which data is transmitted. The time for occupying the bus differs depending on the size of the bits of the message. Typically, a message of more bits occupies the bus longer than a message of less bits does.

Referring to FIG. 2, the apparatus 100 for controlling message communications load may be connected to a number of external devices via channels CH.1, CH.2 and CH.3, respectively. More specifically, the apparatus 100 may be connected to a communications network of external devices 1 to 3 via the channel CH.1. Similarly, the apparatus 100 may be connected to a communications network of the external devices 4 to 6 via the channel 2 CH.2 and may be connected to a communication network of the external devices 7 to 9 via the channel 3 CH.3.

The number of such channels and the number of external devices connected to each of the channels may vary depending on design choice. Likewise, the communications network topology constituted by the external devices may also vary depending on design choice.

Referring to FIG. 3, the apparatus 100 may further include a transmission/reception unit 310 and a count unit 320 in order to compare the number of messages with a predetermined number by the determination unit 110. The transmission/reception unit 310 may receive a message from an external device via a channel and may transmit a message to an external device via a channel. The count unit 320 may count the number of messages transmitted or received by the transmission/reception unit 310, and the counting result may be transmitted to the determination unit 110. The determination unit 110 may determine whether the number of counted messages is equal to a predetermined number.

In addition, the determination unit 110 may determine whether the number of time stamps of the transmitted message and the received message is equal to a predetermined number. More specifically, the data of the transmitted message and the received message may include one time stamp. The time stamp is a time point marked at a specific position in the data to prove that the data existed at the time point.

More specifically, when the bit size of the transmitted message and the received message is 8 bits, one or more bits among 8 bits may include time stamp information of the message. For example, the eighth bit of the transmitted message may include the time stamp information when the transmission is completed. The eighth bit of the received message may include the time stamp information when the reception is completed.

Accordingly, the total number of time stamps may be equal to the total number of messages transmitted/received. The count unit 320 may count the numbers of time stamps of the transmitted message and the received message, and the counting result may be transmitted to the determination unit 110. The determination unit 110 may determine whether the number of counted messages is equal to a predetermined number.

According to an exemplary embodiment of the present disclosure, the calculation unit 120 may calculate the message load based on the time stamps of the transmitted message and the received message and message occupation time. The operation of the calculation unit 120 is performed when it is determined by the determination unit 110 that the number of messages is equal to the predetermined number.

According to an exemplary embodiment of the present disclosure, if the number of messages is equal to the predetermined number, the determination unit 110 may transmit a signal for starting to calculate the message load to the calculation unit 120. In response to the signal, the calculation unit 120 may calculate the message load using the time point marked in the time stamp and the message occupation time.

By measuring the load according to the number of messages, it is possible to control the message load at a faster cycle when there are a large number of transmitted and received messages, that is, when the message load is likely to be large. On the contrary, it is possible to control the message load at a slower cycle when there are a smaller number of transmitted and received messages, that is, when the message load is likely to be small. In this manner, it is possible to efficiently control the communications load.

According to an exemplary embodiment of the present disclosure, the calculation unit 120 may calculate the message load based on the ratio of the total occupation time that is the sum of the measured occupation times to a time stamp difference between the maximum and minimum of the measured time stamps. The time stamp difference may be the time period from the time when the first message is transmitted or received to the time when the last message is transmitted or received. The message occupation time may be the time period for which the bus of the CAN communications is occupied while the message is transmitted or received. Referring again to FIG. 3, the count unit 320 may measure a time stamp of a transmitted message and a received message, and may measure a message occupation time of each message. If the determination unit 110 determines that the number of messages is equal to the predetermined number, the measured time stamp and the message occupation time may be transmitted to the calculation unit 120. The calculation unit 120 may calculate the message load using the measured time stamp and message occupation time.

For example, if the number of messages is required the predetermined number, e.g., 100, the load calculation may be started. For example, the time point of the time stamp of the first counted message may be 3 ms, and the time point of the time stamp of the $100^{th}$ counted message may be 863 ms. In this example, the calculation unit 120 may calculate the time stamp difference as 860 ms, which is the difference between the maximum of the time stamp of 863 ms and the minimum of the time stamp of 3 ms.

The measured message occupation time may be 5 ms, 7 ms, 4 ms, . . . , 8 ms, respectively, from the first counted message to the $100^{th}$ counted message. The calculation unit 120 may calculate the sum of message occupation times of each of the messages. For example, the sum of message occupation times may be 688 ms.

The calculation unit 120 may calculate a ratio of the time period for which the message occupies the bus to the time period from when the first message is transmitted/received to when the last message is transmitted/received, as the message load. In the above example where the time stamp difference is 860 ms and the sum of the occupation times is 688 ms, the calculation unit 120 can calculate the ratio of 688 ms/860 ms=0.8 as the message load. The calculation unit 120 may multiply the above ratio by 100 to express it in percentage, to calculate 80% as the message load.

According to an exemplary embodiment of the present disclosure, the control unit 130 may transmit a control instruction to external devices to adjust the communications interval of the received message according to the calculated message load. The communications interval may refer to a transmission/reception interval of a transmitted message and/or a received message. The control instruction may include a first control instruction for increasing the communications interval of a received message and a second control instruction for decreasing the communications interval of the received message.

When the control instruction is transmitted to an external device, the external device enters a control mode, and then the external device controls the transmission interval of the message. For example, when the first control instruction is transmitted to an external device, the external device may enter the first control mode and increase the transmission interval of the message. On the contrary, when the second control instruction is transmitted to an external device, the external device may enter the second control mode and decrease the transmission interval of the message.

For example, when communications is carried out based on the AUTOSAR operating system, the control instruction may include a transmission mode switch (TMS) signal to change the cycle of the message.

Referring again to FIG. 3, the control unit 130 may transmit the first control instruction to the external devices when the calculated message load is equal to or greater than a predetermined maximum load. The predetermined maximum load may vary depending on design choice and may be, for example, 0.7 or 70%. If the message load is 80% as in the above-mentioned example, which is above the predetermined maximum load 70%, and thus the control unit 130 may generate the first control instruction and transmit it to the external devices.

According to an exemplary embodiment of the present disclosure, the control unit 130 may use the transmission/reception unit 310 to transmit the first control instruction to the external devices. More specifically, the control unit 130 may transmit a control signal to the transmission/reception unit 310, and the control signal may control the transmission/reception unit 310 so that it transmits the first control instruction to the external devices.

Accordingly, the first control instruction can be transmitted to the external devices 1 to 3 via the respective channel through which the message is transmitted/received, and the external devices 1 to 3 can enter the first control mode. When the external devices enter the first control mode, the cycle of the message received from the external devices may increase.

On the other hand, if the calculated message load is below the predetermined minimum load, the control unit 130 may transmit the second control instruction to the external devices. The predetermined minimum load may be set to be less than the predetermined maximum load.

According to an exemplary embodiment of the present disclosure, the control unit 130 may use the transmission/reception unit 310 to transmit the second control instruction to the external devices. More specifically, the control unit 130 may transmit a control signal to the transmission/reception unit 310, and the control signal may control the transmission/reception unit 310 so that it transmits the second control instruction to the external devices.

Accordingly, the second control instruction can be transmitted to the external devices 1 to 3 via the respective channel through which the message is transmitted/received, and the external devices 1 to 3 can enter the second control mode. When the external devices enter the second control mode, the cycle of the message received from the external devices may decrease.

FIG. 3 illustrates the apparatus 100 for controlling message communications load is connected to the plurality of external devices via a single channel. It is, however, to be understood that the message load may be calculated for each of a plurality of channels in a communications network including the channels, and control instructions may be transmitted to external devices via the respective channels depending on the calculated message load.

Figure 4:
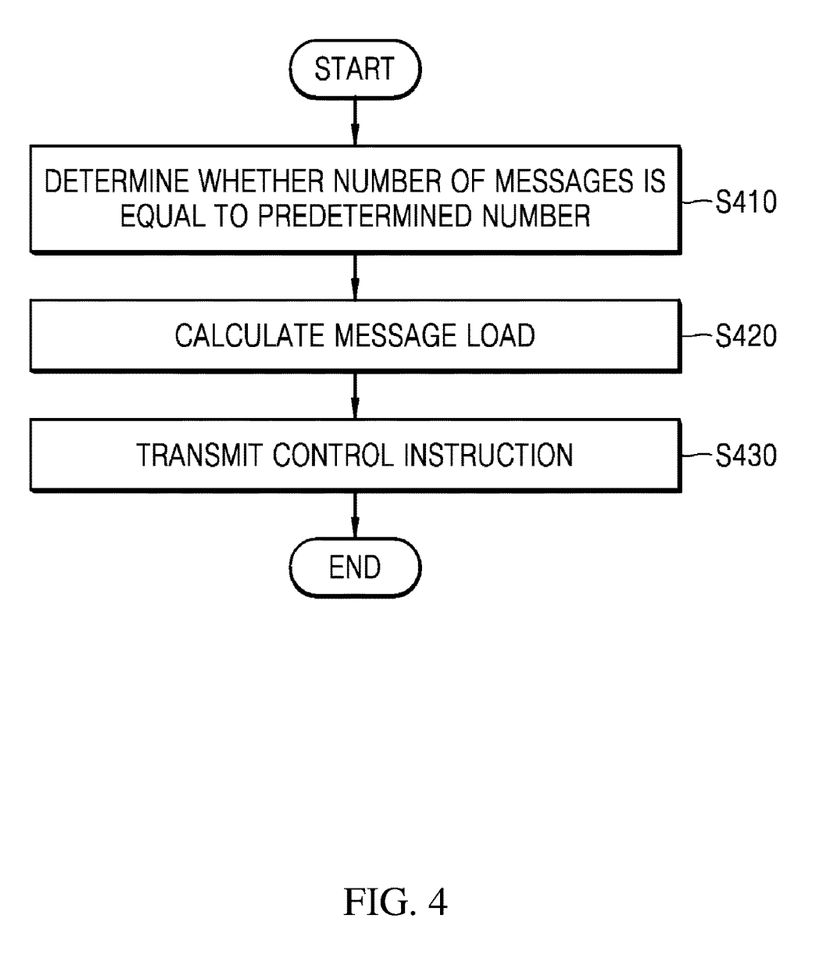
FIG. 4 is a flowchart illustrating a method for controlling a message communications load according to an exemplary embodiment of the present disclosure.

FIG. 4 is a flowchart illustrating a method for controlling a message communications load according to an exemplary embodiment of the present disclosure. Hereinafter, the method will be described in detail with reference to FIG. 4.

The method for controlling message communications load described below may be performed by the apparatus for controlling message communications load shown in FIG. 1. The apparatus has been described above, and thus a detailed description thereof will not be made.

Referring to FIG. 4, the apparatus determines whether the number of transmitted messages transmitted to the external devices and the received messages received from the external devices is equal to a predetermined number (step S410).

If it is determined that the number of the transmitted messages and the received messages is equal to the predetermined number, the apparatus calculates a message load based on the time stamps and the message occupation times of the transmitted messages and the received messages (step S420).

Subsequently, the apparatus transmits a control instruction for adjusting the communications interval of the received message to the external devices according to the calculated message load (step S430).

The step S610 may be identical to the method described in the determination unit 110 shown in FIG. 1, and the step S620 may be identical to the method described in the calculation unit 120 shown in FIG. 1. In addition, step S430 may be identical to the method described in the control unit 130 shown in FIG. 1.

Figure 5:
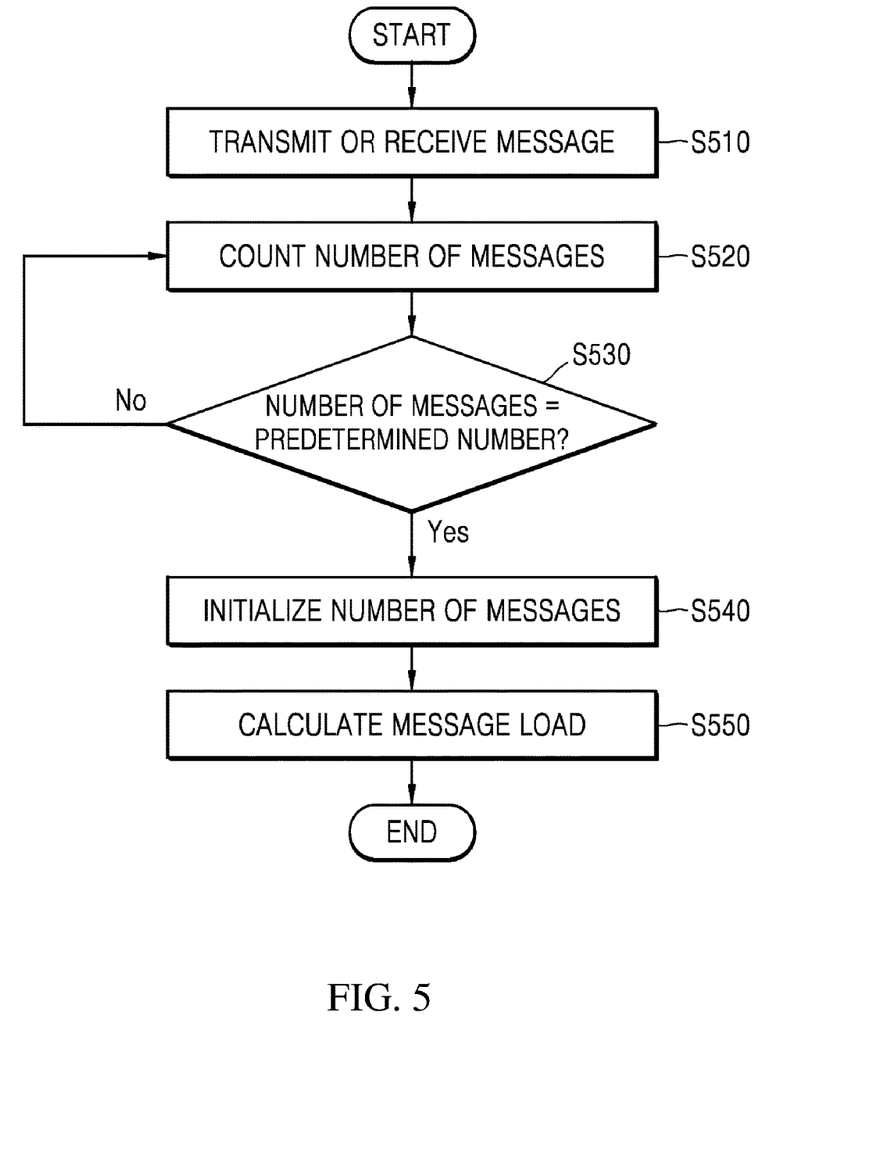
FIG. 5 is a flowchart illustrating an example of a process for determining whether the number of messages is equal to a predetermined number.

FIG. 5 is a flowchart illustrating an example of a process for determining whether the number of messages is equal to a predetermined number. Hereinafter, a method for determining whether or not the number of messages is equal to a predetermined number will be described in detail with reference to FIG. 5.

Referring to FIG. 5, initially, the apparatus may send a message to external devices or receive a message from external devices (step S510).

Subsequently, the apparatus may count the number of transmitted or received messages (step S520). The number of time stamps included in each message may be counted as described above.

Subsequently, the apparatus may determine whether the number of counted messages is equal to the predetermined number (step S530), and if not, may keep counting the number of messages.

If the number of counted messages is equal to the predetermined number, the apparatus may initialize the number of counted messages (step S540) and calculate a message load (step S550).

For example, when the predetermined number is 100, the apparatus may initialize the number of counted messages to zero when the number reaches 100, and may calculate a message load using the previously counted, 100 messages.

Accordingly, the number of messages initialized to zero is counted again until the number of messages reaches 100, and the above operation may be repeated when the number of messages reaches 100 again. In this manner, the load of every transmitted/received message can be calculated.

Step S510 may be performed by the transmission/reception unit 310 shown in FIG. 3, and steps S520 and S540 may be performed by the count unit 320 shown in FIG. 3.

Figure 6:
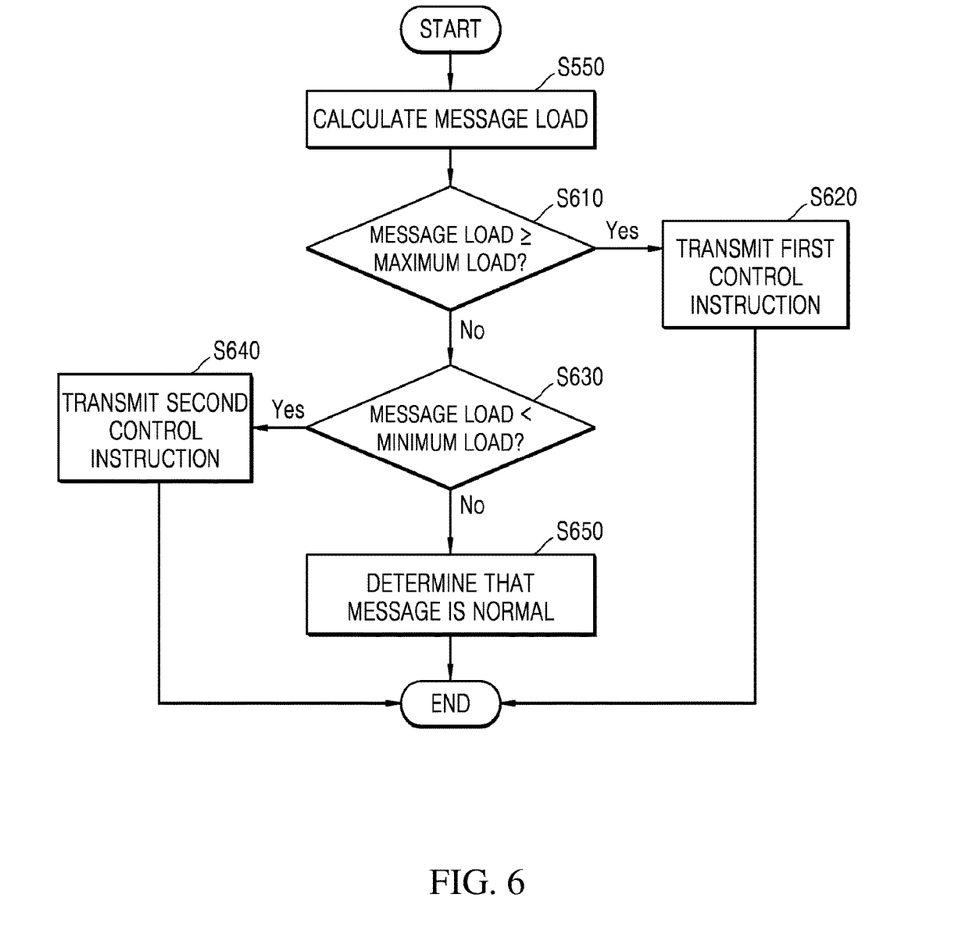
FIGS. 6 and 7 are flowcharts illustrating examples of process of transmitting a control instruction according to a message load.
Figure 7:
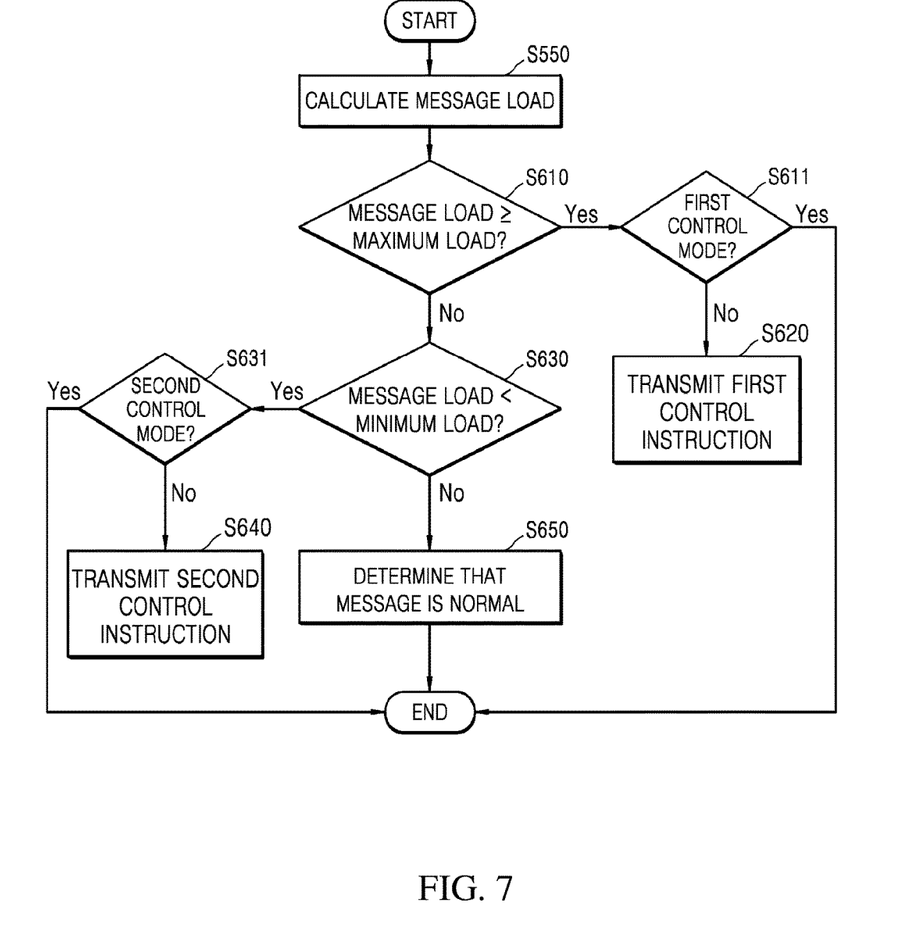

FIGS. 6 and 7 are flowcharts illustrating examples of process of transmitting a control instruction according to a message load. Hereinafter, a method for transmitting a control instruction to external devices according to an exemplary embodiment of the present disclosure will be described in detail with reference to FIG. 6.

Referring to FIG. 6, the apparatus may calculate a message load based on the time stamps and the message occupation time of transmitted messages and received messages (step S550), and determine whether the message load above the maximum load (step S610). If it is determined that the message load is above the maximum load, the apparatus may transmit the first control instruction to the external devices (step S620).

On the other hand, if the message load is less than the maximum load, the apparatus may determine whether the message load is less than the minimum load (step S630). If it is determined that the message load is less than the minimum load, the apparatus may transmit the second control instruction to the external devices (step S640). If the message load is above the minimum load, the apparatus may determine that the message load is normal (step S650).

Hereinafter, a method for transmitting a control instruction to external devices according to an exemplary embodiment of the present disclosure will be described in detail with reference to FIG. 7.

Referring to FIG. 7, the apparatus may calculate a message load based on the time stamps and the message occupation time of transmitted messages and received messages (step S550), and determine whether the message load is above the maximum load (step S610). If it is determined that the message load is above the maximum load, the apparatus may determine where the external device connected to the channel is in the first control mode (step S611).

More specifically, according to an exemplary embodiment of the present disclosure, if the cycle of the received message received from an external device is above the reference cycle, the apparatus may determine that the external device is in the first control mode.

If it is determined that the cycle of the received message is above the reference cycle, the apparatus may determine that the external device is already in the first control mode and may not transmit the first control instruction. On the other hand, if it is determined that the cycle of the received message is below the reference cycle, the apparatus may determine that the external device is not in the first control mode and may transmit the first control instruction (step S620).

On the other hand, if the message load is less than the maximum load, the apparatus may determine whether the message load is less than the minimum load (step S630).

If it is determined that the message load is less than the maximum load, the apparatus may determine whether the external device connected to the channel is in the second control mode. More specifically, according to an exemplary embodiment of the present disclosure, if the cycle of the received message received from an external device is below the reference cycle, the apparatus may determine that the external device is in the second control mode.

The apparatus may compare the cycle of the received message with the reference cycle. If it is determined that the external device is already in the second control mode, the apparatus may not transmit the second control instruction. Otherwise, the apparatus may transmit the second control instruction (step S640). If the message load is above the minimum load, the apparatus may determine that the message load is normal (step S650).

Steps S610, S630 and S650 may be performed by the control unit 130 shown in FIG. 1. Steps S620 and S640 may be performed by the control unit 130 and the transmission/reception unit 310 shown in FIG. 3. In addition, steps S611 and S631 may be performed by the determination unit 110 shown in FIG. 1.

The present disclosure described above may be variously substituted, altered, and modified by those skilled in the art to which the present invention pertains without departing from the scope and spirit of the present disclosure. Therefore, the present disclosure is not limited to the above-mentioned exemplary embodiments and the accompanying drawings.

What is claimed is:

1. An apparatus for controlling a message communications load comprising microprocessor configured to:
   determine whether a number of messages transmitted to external devices and messages received from the external devices is equal to a predetermined number;
   calculate a message load based on time stamps and a message occupation time of the messages if it is determined that the number of the messages is equal to the predetermined number; and
   transmit a control instruction to the external devices to adjust a communications interval of the received messages according to the calculated message load.

2. The apparatus of claim 1, wherein the microprocessor calculates the message load based on a ratio of a time stamp difference to a total occupation time, wherein the time stamp difference is a difference between a maximum and a minimum of the measured time stamps, and the total occupation time is a sum of the measured occupation times.

3. The apparatus of claim 1, wherein the control instruction comprises a first control instruction to increase the communications interval of the received messages, and wherein the microprocessor transmits the first control instruction to the external devices if the calculated message load is above a predetermined maximum load.

4. The apparatus of claim 1, wherein the control instruction comprises a second control instruction to decrease the communications interval of the received messages, and wherein the microprocessor transmits the second control instruction to the external devices if the calculated message load is below a predetermined minimum load.

5. The apparatus of claim 1, wherein the microprocessor determines whether the number of time stamps of the transmitted messages and the received messages is equal to the predetermined number.

6. A method for controlling a message communications load comprising:
   determining whether a number of messages transmitted to external devices and messages received from the external devices is equal to a predetermined number;
   calculating a message load based on time stamps and a message occupation time of the messages if it is determined that the number of the messages is equal to the predetermined is number; and
   transmitting a control instruction to the external devices to adjust a communications interval of the received messages according to the calculated message load.

7. The method of claim 6, wherein the calculating the message load comprises calculating the message load based on a ratio of a time stamp difference to a total occupation time, wherein the time stamp difference is a difference between a maximum and a minimum of the measured time stamps, and the total occupation time is a sum of the measured occupation times.

8. The method of claim 6, wherein the control instruction comprises a first control instruction to increase the communications interval of the received messages, and wherein the transmitting the control instruction comprises transmitting the first control instruction to the external devices if the calculated message load is above a predetermined maximum load.

9. The method of claim 6, wherein the control instruction comprises a second control instruction to decrease the communications interval of the received messages, and wherein the transmitting the control instruction comprises transmitting the second control instruction to the external devices if the calculated message load is below a predetermined minimum load.

10. The method of claim 6, wherein the determining whether the number of the messages is equal to the predetermined number comprises determining whether the number of the time stamps of the messages is equal to a predetermined number.

* * * * *